United States Patent
Hayashi et al.

(10) Patent No.: US 11,863,416 B2
(45) Date of Patent: Jan. 2, 2024

(54) IMPARTING DEVICE, IMPARTING METHOD, AND IMPARTING PROGRAM

(71) Applicant: Nippon Telegraph and Telephone Corporation, Tokyo (JP)

(72) Inventors: Yuhei Hayashi, Musashino (JP); Hiroshi Osawa, Musashino (JP); Takeaki Nishioka, Musashino (JP); Hiroki Inoue, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/801,691

(22) PCT Filed: Feb. 27, 2020

(86) PCT No.: PCT/JP2020/008182
§ 371 (c)(1),
(2) Date: Aug. 23, 2022

(87) PCT Pub. No.: WO2021/171526
PCT Pub. Date: Sep. 2, 2021

(65) Prior Publication Data
US 2023/0254234 A1 Aug. 10, 2023

(51) Int. Cl.
*H04L 43/0876* (2022.01)
*H04L 43/04* (2022.01)
*H04L 43/067* (2022.01)

(52) U.S. Cl.
CPC .......... *H04L 43/0876* (2013.01); *H04L 43/04* (2013.01); *H04L 43/067* (2013.01)

(58) Field of Classification Search
CPC ........................... H04L 43/0876; H04L 43/04
See application file for complete search history.

(56) References Cited

U.S. PATENT DOCUMENTS 10,581,891 B1 * 3/2020 Kapoor ............... G06F 16/9024
2008/0123545 A1 5/2008 Watanabe et al.
(Continued)

FOREIGN PATENT DOCUMENTS

| JP | 2008136012 | 6/2008 |
| JP | 2012253735 | 12/2012 |

OTHER PUBLICATIONS

Arbor Networks, "Comprehensive protection against large DDOS attacks and threats," Netscout, Feb. 18, 2020, retrieved from URL <http://jp.arbornetworks.com/>, 11 pages (with English Translation).

(Continued)

*Primary Examiner* — Shirley X Zhang
(74) *Attorney, Agent, or Firm* — Fish & Richardson P.C.

(57) ABSTRACT

A detection device includes: a statistic unit that acquires statistical value data on 5-tuple flows in a certain time period; a degree centrality calculation unit that calculates a degree centrality of a node including an indegree, which is a total sum of a weight of each edge flowing into the node, and an outdegree, which is a total sum of a weight of each edge flowing out of the node, based on the statistical value data on the 5-tuple flows in the certain time period; and a degree centrality impartation unit that imparts the degree centrality, as a feature, to the statistical value data on the 5-tuple flows in the certain time period.

12 Claims, 15 Drawing Sheets

(56) References Cited

U.S. PATENT DOCUMENTS

2012/0311704 A1  12/2012  Reilly
2016/0028762 A1   1/2016  Di Pietro

OTHER PUBLICATIONS

Kurakami et al., "Abnormal traffic detection / analysis system," NTT Technical Journal, 2008, retrieved from URL <https://www.ntt.co.jp/journal/0807/files/jn200807020.pdf>, 20(7): 9 pages (with English Translation).

Orizon Systems Co., Ltd., "Flowmon," orizon.co.jp, retrieved on Feb. 18, 2020, retrieved from URL <https://www.orizon.co.jp/products/flowmon/>, 27 pages (with English Translation).

Sato et al., "Security Technologies of IoT Gateway," Mitsubishi Electric Technical Report, 2018, 92(6): 11 pages (with English Translation).

\* cited by examiner

Fig. 2

| IP ADDRESS GRAPH TABLE | | | | | | | | | 1221 |
|---|---|---|---|---|---|---|---|---|---|
| CENTRALITY / NODE | INDEGREE | | | | OUTDEGREE | | | | |
| | PRESENCE/ ABSENCE OF EDGE | NUMBER OF 5-TUPLE FLOWS | NUMBER OF PACKETS | NUMBER OF BYTES | PRESENCE/ ABSENCE OF EDGE | NUMBER OF 5-TUPLE FLOWS | NUMBER OF PACKETS | NUMBER OF BYTES | |
| | | | | | | | | | |
| ... | | | | | | | | | |
| | | | | | | | | | |

Fig. 3

(IP ADDRESS, PORT, PROTOCOL) GRAPH TABLE 1222

| CENTRALITY / NODE | INDEGREE | | | | OUTDEGREE | | | |
|---|---|---|---|---|---|---|---|---|
| | PRESENCE/ ABSENCE OF EDGE | NUMBER OF 5-TUPLE FLOWS | NUMBER OF PACKETS | NUMBER OF BYTES | PRESENCE/ ABSENCE OF EDGE | NUMBER OF 5-TUPLE FLOWS | NUMBER OF PACKETS | NUMBER OF BYTES |
| | | | | | | | | |
| ⋮ | | | | | | | | |
| | | | | | | | | |

Fig. 8

IP ADDRESS GRAPH TABLE 1221

| CENTRALITY / NODE | INDEGREE | | | | OUTDEGREE | | | |
|---|---|---|---|---|---|---|---|---|
| | PRESENCE/ABSENCE OF EDGE | NUMBER OF 5-TUPLE FLOWS | NUMBER OF PACKETS | NUMBER OF BYTES | PRESENCE/ABSENCE OF EDGE | NUMBER OF 5-TUPLE FLOWS | NUMBER OF PACKETS | NUMBER OF BYTES |
| x | | | | | 2 | 2 | $\alpha+\gamma$ | $\beta+\delta$ |
| y | 1 | 1 | $\alpha$ | $\beta$ | | | | |
| z | 1 | 1 | $\gamma$ | $\delta$ | | | | |

Fig. 9

(IP ADDRESS, PORT, PROTOCOL) GRAPH TABLE 1222

| CENTRALITY / NODE | INDEGREE | | | OUTDEGREE | | |
|---|---|---|---|---|---|---|
| | PRESENCE/ABSENCE OF EDGE | NUMBER OF 5-TUPLE FLOWS | NUMBER OF PACKETS | NUMBER OF BYTES | PRESENCE/ABSENCE OF EDGE | NUMBER OF 5-TUPLE FLOWS | NUMBER OF PACKETS | NUMBER OF BYTES |
| (x,a,udp) | | | | | 1 | 1 | $\gamma$ | $\delta$ |
| (x,b,udp) | | | | | 1 | 1 | $\alpha$ | $\beta$ |
| (y,d,udp) | 1 | 1 | $\alpha$ | $\beta$ | | | | |
| (z,c,udp) | 1 | 1 | $\gamma$ | $\delta$ | | | | |

IMPARTING DEVICE, IMPARTING METHOD, AND IMPARTING PROGRAM

CROSS-REFERENCE TO RELATED APPLICATIONS

This application is a National Stage application under 35 U.S.C. § 371 of International Application No. PCT/JP2020/008182, having an International Filing Date of Feb. 27, 2020. The disclosure of the prior application is considered part of the disclosure of this application, and is incorporated by reference in its entirety into this application.

TECHNICAL FIELD

The present invention relates to an impartation device, an impartation method, and an impartation program.

BACKGROUND ART

Conventionally, techniques have been proposed that detect a DDoS attack (Distributed Denial of Service attack) in a network by making a router and a flow collector to cooperate with each other, and using, as a scale, a flow defined by 5-tuple, or a transfer capacity in terms of the number of packets (packets per second: pps) or a transfer capacity in terms of the amount of data (bits per second: bps) of collected flows.

CITATION LIST

Non-Patent Literature

Non-Patent Literature 1: Arbor Networks, Arbor Slight Line, [online], [retrieved on Feb. 18, 2020], Internet <URL: http://jp.arbornetworks.com/>
Non-Patent Literature 2: Kurakami et al., "Abnormal traffic detection and analysis system", NTT GIJUTU Journal, 2008.7., [online], [retrieved on Feb. 18, 2020], Internet <URL: https://www.ntt.co.jp/journal/0807/files/jn200807020.pdf>
Non-Patent Literature 3: Flowmon, [online], [retrieved on Feb. 18, 2020], Internet <URL: https://www.orizon.co.jp/products/flowmon/>

SUMMARY OF THE INVENTION

Technical Problem

However, the conventional techniques cannot achieve attack detection based on a network-structure perspective, such as detection of an incident of a victim receiving many attack packet flows from a large number of attackers, or an incident of an infected terminal sending many attack packet flows to a large number of host ports, which are characteristics of DDoS attacks.

The present invention has been made in view of the foregoing, and an object of the present invention is to provide an impartation device, an impartation method, and an impartation program that can enhance accuracy in DDoS attack detection.

Means for Solving the Problem

To solve the problem and achieve the object, an impartation device of the present invention includes: a statistic unit that acquires statistical value data on 5-tuple flows in a certain time period; a calculation unit that calculates a degree centrality of a node including an indegree, which is a total sum of a weight of each edge flowing into the node, and an outdegree, which is a total sum of a weight of each edge flowing out of the node, based on the statistical value data on the 5-tuple flows in the certain time period; and an impartation unit that imparts the degree centrality, as a feature, to the statistical value data on the 5-tuple flows in the certain time period.

An impartation method of the present invention is an impartation method executed by an impartation device, including: acquiring statistical value data on 5-tuple flows in a certain time period; calculating a degree centrality of a node including an indegree, which is a total sum of a weight of each edge flowing into the node, and an outdegree, which is a total sum of a weight of each edge flowing out of the node, based on the statistical value data on the 5-tuple flows in the certain time period; and imparting the degree centrality, as a feature, to the statistical value data on the 5-tuple flows in the certain time period.

An impartation program of the present invention causes a computer to execute: acquiring statistical value data on 5-tuple flows in a certain time period; calculating a degree centrality of a node including an indegree, which is a total sum of a weight of each edge flowing into the node, and an outdegree, which is a total sum of a weight of each edge flowing out of the node, based on the statistical value data on the 5-tuple flows in the certain time period; and imparting the degree centrality, as a feature, to the statistical value data on the 5-tuple flows in the certain time period.

Effects of the Invention

According to the present invention, accuracy in DDoS attack detection can be enhanced.

BRIEF DESCRIPTION OF DRAWINGS

FIG. 2 shows an example of a data configuration of a graph table.
FIG. 3 shows an example of a data configuration of a graph table.
FIG. 8 is a diagram describing an example of a result of graph calculation by the centrality calculation unit.
FIG. 9 is a diagram describing an example of a result of graph calculation by the centrality calculation unit.

DESCRIPTION OF EMBODIMENTS

Hereinafter, an embodiment of the present invention will be described in detail with reference to drawings. Note that the present invention is not limited by the embodiment. In a description of the drawings, the same portions are denoted by the same reference signs.

Embodiment

A detection device according to the present embodiment makes it possible to enhance accuracy in DDoS attack detection, by imparting information on degree centrality related to a network structure.

[Detection Device]

Figure 1:
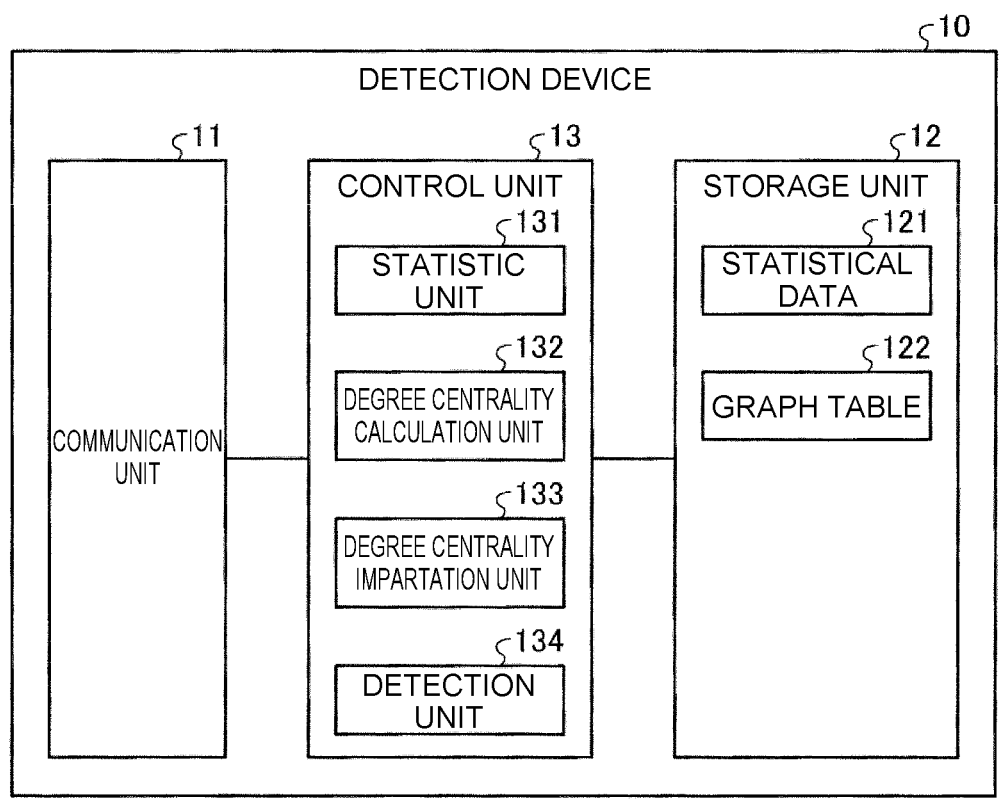
FIG. 1 is a diagram describing an example of a configuration of a detection device according to an embodiment.

First, the detection device according to the embodiment will be described. FIG. 1 is a diagram describing an example of a configuration of the detection device according to the embodiment. The detection device 10 according to the present embodiment includes a communication unit 11, a storage unit 12, and a control unit 13.

The communication unit 11 is a communication interface that transmits various information to and receives various information from another device connected through a network or the like. The communication unit 11 is implemented by a NIC (Network Interface Card) or the like, and performs communication between another device and the control unit 13 (which will be describe later) over a telecommunication circuit such as a LAN (Local Area Network) or the Internet. For example, the communication unit 11 is connected to an external device through a network or the like, and receives input of a packet to be analyzed.

The storage unit 12 is implemented by a semiconductor memory device such as a RAM (Random Access Memory) or a flash memory, or a storage device such as a hard disk or an optical disk, and stores a processing program that causes the detection device 10 to operate, data used during execution of the processing program, and the like. The storage unit 12 includes statistical data 121 and a graph table 122.

The statistical data 121 is data on statistical values of a 5-tuple statistical flow acquired by a statistic unit 131 (which will be described later).

The graph table 122 is a table for graph that is used in calculation of a network graph by a degree centrality calculation unit 132 (which will be described later). FIGS. 2 and 3 show examples of a data configuration of the graph table 122.

In a graph table 1221 (first table) shown in FIG. 2, node granularity is an IP address. In a graph table 1222 (second table) shown in FIG. 3, node granularity is a combination of an IP address, a port number, and protocol information. In the graph table 1221, an IP address of a node is associated with each item for an indegree and each item for an outdegree. In the graph table 1222, a combination of an IP address, a port number, and protocol information of a node is associated with an indegree and an outdegree of the node.

The items for an indegree include: presence/absence of an edge (the number of edges) communicated by the corresponding node; the number of 5-tuple flows received by the corresponding node; the number of packets received by the corresponding node; and the number of bytes in received data. The items for an outdegree include: presence/absence of an edge (the number of edges) communicated by the corresponding node; the number of 5-tuple flows sent by the corresponding node; the number of packets sent by the corresponding node; and the number of bytes in sent data. Each column of the graph tables 1221, 1222 is updated by the degree centrality calculation unit 132, and is initialized by a degree centrality impartation unit 133.

The control unit 13 includes an internal memory for storing a program defining various processing procedures and required data, and executes various processing based on the program and the data. For example, the control unit 13 is an electronic circuit such as a CPU (Central Processing Unit) or an MPU (Micro Processing Unit). The control unit 13 includes the statistic unit 131, the degree centrality calculation unit 132 (calculation unit), the degree centrality impartation unit 133 (impartation unit), and a detection unit 134.

The statistic unit 131 acquires statistical value data on 5-tuple statistical flows, with respect to received packets buffered for a certain time period. The statistic unit 131 stores the statistical value data on the 5-tuple statistical flows in the certain time period in the storage unit 12.

Figure 4:
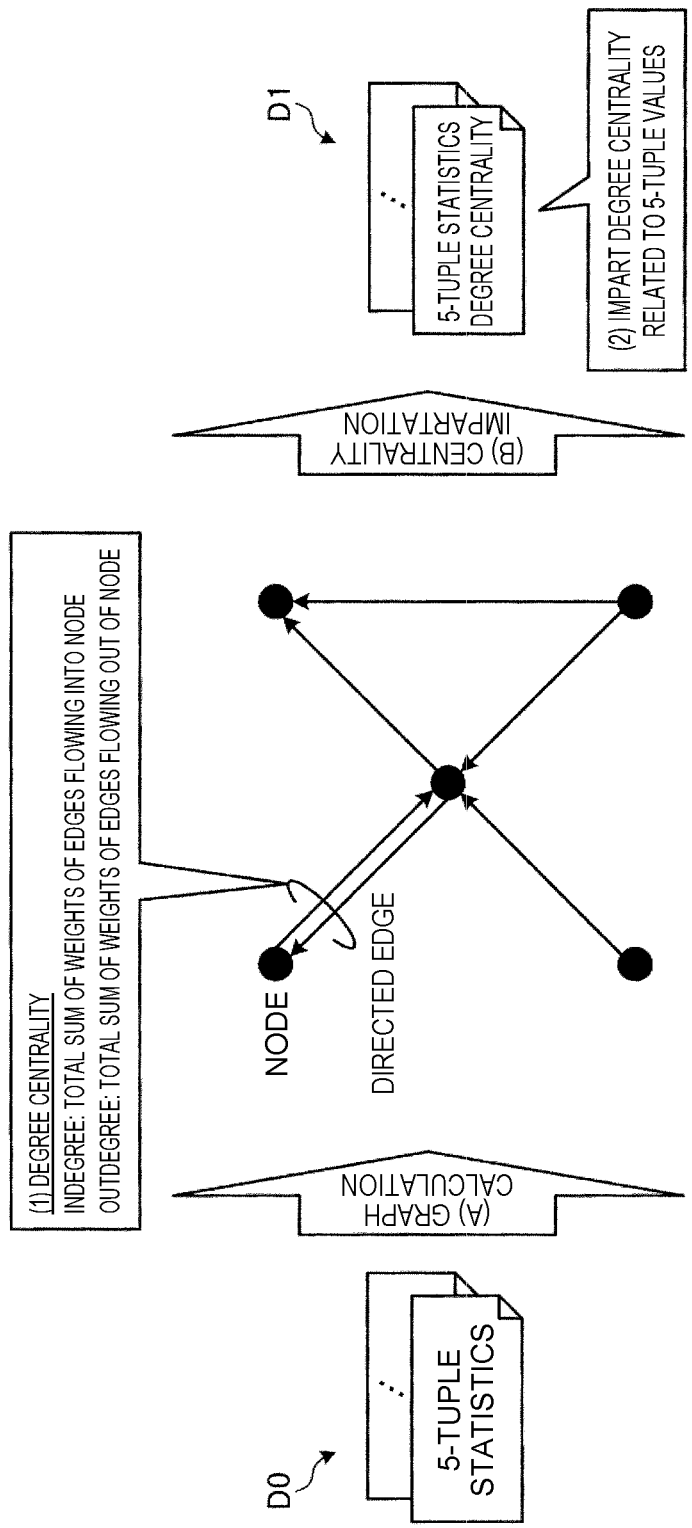
FIG. 4 is a diagram describing processing by a centrality calculation unit and a centrality impartation unit.
Figure 5:
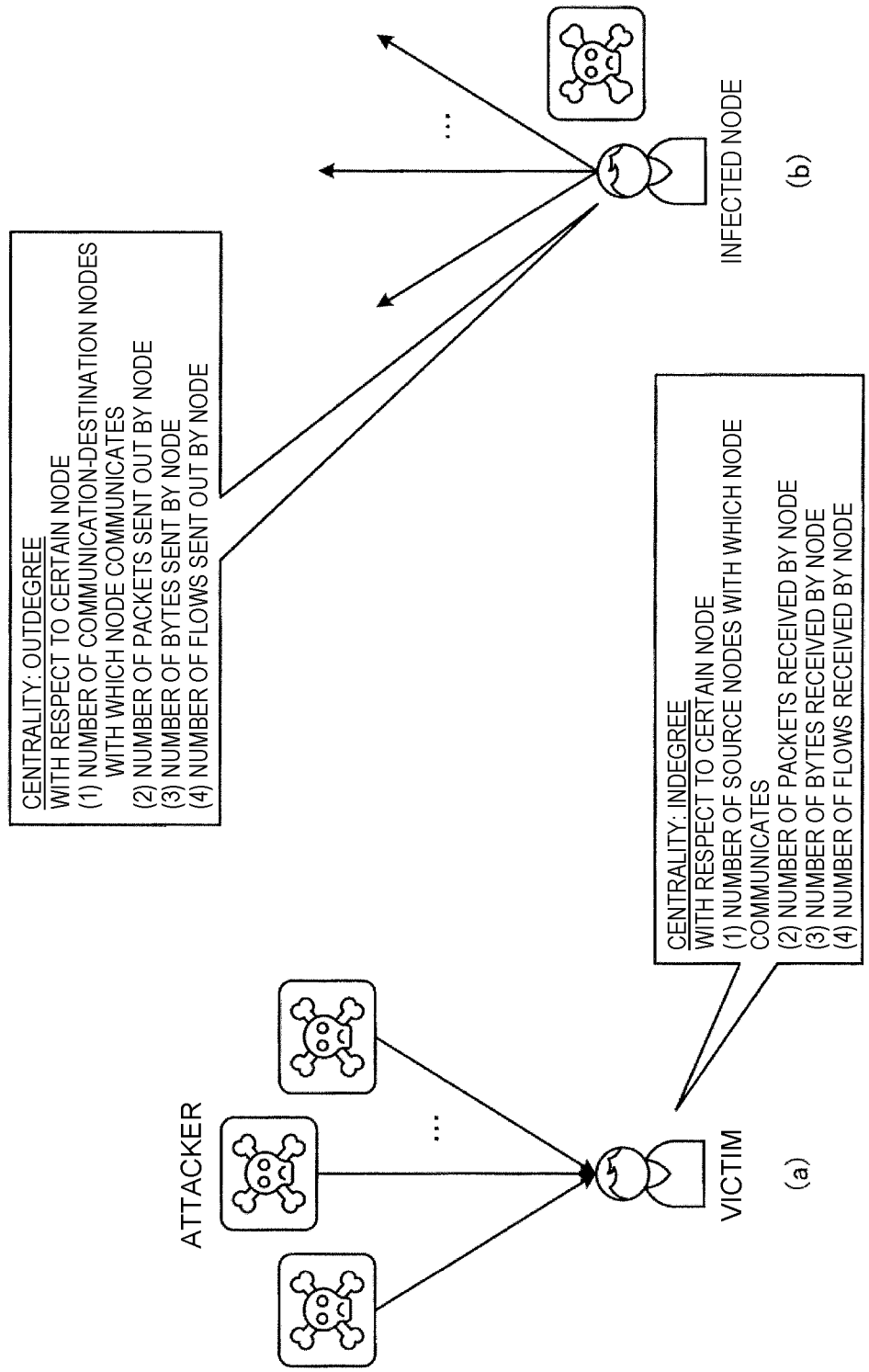
FIG. 5 is a diagram describing processing by the centrality calculation unit and the centrality impartation unit.

The degree centrality calculation unit 132 calculates a degree centrality of a node, based on the statistical value data on the 5-tuple flows in the certain time period acquired by the statistic unit 131. FIGS. 4 and 5 are diagrams describing processing by the degree centrality calculation unit 132 and the degree centrality impartation unit 133.

The degree centrality of a node is a feature including an indegree, which is a total sum of weights of edges flowing into the node, and an outdegree, which is a total sum of weights of edges flowing out of the node (see (1) in FIG. 4). Note that the granularity of the node is an IP address, or a combination of an IP address, a port number, and protocol information. An arrow between nodes in FIG. 4 indicates a direction of an edge directed from a source node toward a destination node. Types of edge weights include presence/absence of a communication (the number of edges communicated), the number of statistical data samples, the number of packets, and the number of bytes.

As shown at (a) in FIG. 5, the indegree represents the following, with respect to a certain node:
  (1) the number of source nodes with which the node communicates;
  (2) the number of packets received by the node;
  (3) the number of bytes received by the node; and
  (4) the number of flows received by the node.

Note that the node is an IP address, or a combination of an IP address and a port number. The indegree represents a degree of input of flows at a certain node from other nodes, and serves as an indicator detecting that the node may be a victim attacked by attackers when the indegree has a high value.

As shown at (b) in FIG. 5, the outdegree represents the following, with respect to a certain node:
  (1) the number of communication-destination nodes with which the node communicates;
  (2) the number of packets sent out by the node;
  (3) the number of bytes sent by the node; and
  (4) the number of flows sent out by the node.

The outdegree represents a degree of output of flows at a certain node to other nodes, and serves as an indicator detecting that the node may be an attacker or an infected node when the outdegree has a high value.

The degree centrality calculation unit 132 selects the graph table 1221 or the graph table 1222, depending on the granularity of a node under analysis, performs graph calculation for statistical value data DO on 5-tuple flows in a certain time period by using the selected table, and thereby calculates a degree centrality for the statistical value data on the 5-tuple flows in the certain time period (see (A) in FIG. 4).

Figure 6:
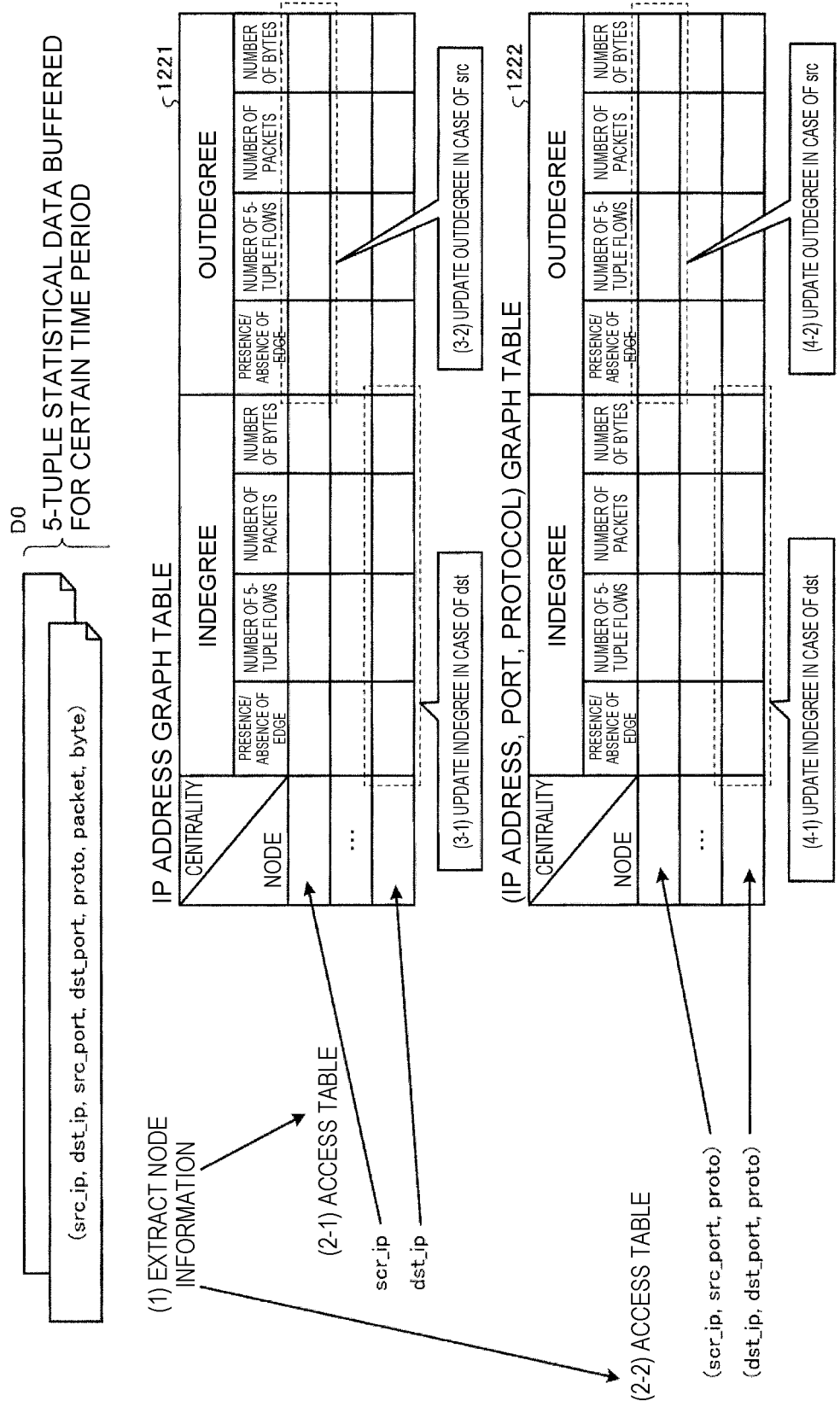
FIG. 6 is a diagram describing processing by the centrality calculation unit.

Processing by the degree centrality calculation unit 132 will be described specifically with reference to FIG. 6. FIG. 6 is a diagram describing the processing by the degree centrality calculation unit 132. As shown in FIG. 6, the degree centrality calculation unit 132 extracts information on a node under analysis from the statistical value data DO on the 5-tuple flows in the certain time period (see (1) in FIG. 6). The degree centrality calculation unit 132 then selects either the graph table 1221 or the graph table 1222, depending on the granularity of the node to be analyzed.

When the granularity is an IP address, the degree centrality calculation unit 132 selects the graph table 1221 in which node granularity is an IP address, and accesses, in the graph table 1221, a row in which the extracted node is stated (see (2-1) in FIG. 6). When the granularity is a combination of an IP address, a port number, and protocol information, the degree centrality calculation unit 132 selects the graph table 1222 in which node granularity is a combination of an IP address, a port number, and a protocol information, and accesses, in the graph table 1222, a row in which the extracted node is stated (see (2-2) in FIG. 6).

Subsequently, when the extracted node corresponds to a destination IP address (dst_ip), the degree centrality calculation unit 132 acquires, from the statistical value data DO on the 5-tuple flows, presence/absence of an edge (the number of edges) communicated by the node, the number of 5-tuple flows received by the node, the number of packets received by the node, and the number of bytes in the received data. The degree centrality calculation unit 132 updates each of fields of the presence/absence of an edge (the number of edges), the number of 5-tuple flows, the number of packets, and the number of bytes under the indegree in the accessed row in the graph table 1221, 1222, with the respective values acquired (see (3-1), (4-1) in FIG. 6).

When the extracted node is a source IP address (src_ip), the degree centrality calculation unit 132 acquires, from the statistical value data DO on the 5-tuple flows, presence/absence of an edge (the number of edges) communicated by the node, the number of 5-tuple flows sent by the node, the number of packets sent by the node, and the number of bytes in the sent data. The degree centrality calculation unit 132 then updates each of fields of the presence/absence of an edge (the number of edges), the number of 5-tuple flows, the number of packets, and the number of bytes under the outdegree in the accessed row in the graph table 1221, 1222, with the respective values acquired (see (3-2), (4-2) in FIG. 6).

Figure 7:
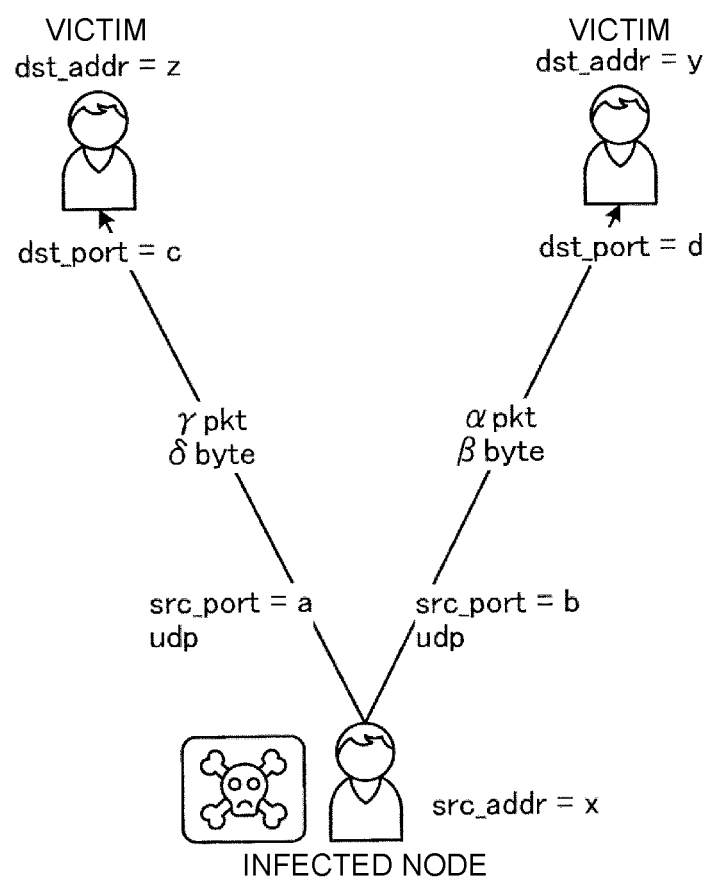
FIG. 7 is a diagram describing an example of communication between nodes.

FIG. 7 is a diagram describing an example of communication between nodes. FIGS. 8 and 9 are diagrams describing examples of a result of the graph calculation by the degree centrality calculation unit 132. In the example in FIG. 7, a flow with a number "α" of packets and a number "β" of bytes is transmitted from a node with an IP address "x" to a node with an IP address "y" via a port "a". A flow with a number "γ" of packets and a number "δ" of bytes is transmitted from the node with the IP address "x" to a node with an IP address "z" via a port "b".

When node granularity is an IP address, with respect to the node "x", since the node is the source of the packets, the degree centrality calculation unit 132 updates the number of edges to "2", the 5-tuple flows to "2", the number of packets to "α+γ", and the number of bytes to "β+δ" under the outdegree in the row of the node "x" in the graph table 1221, as shown in FIG. 8. With respect to the node "y", since the node is a destination of the packets, the degree centrality calculation unit 132 updates the number of edges to "1", the 5-tuple flows to "1", the number of packets to "α", and the number of bytes to "β" under the indegree in the row of the node "y" in the graph table 1221.

When node granularity is a combination of an IP address, a port number, and protocol information, as shown in FIG. 9, the degree centrality calculation unit 132 updates the number of edges to "1", the 5-tuple flows to "1", the number of packets to "γ", and the number of bytes to "δ" under the outdegree in the row of the node "(x, a, udp)" in the graph table 1222. With respect to the node "(y, d, udp)", since the node is a destination of the packets, the degree centrality calculation unit 132 updates the number of edges to "1", the 5-tuple flows to "1", the number of packets to "α", and the number of bytes to "β" under the indegree in the row of the node "(y, d, udp)" in the graph table 1222.

As described above, by using the graph table 1221, 1222, the degree centrality calculation unit 132 calculates, from the statistical value data DO on the 5-tuple flows in the certain time period, a network graph that represents "from which address to which address a communication is performed, how many packets flow, and how much statistical value data is communicated", or "from which (address, port, protocol) combination to which (address, port, protocol) combination a communication is performed, how many packets flow, and how much statistical value data is communicated".

Next, referring back to FIGS. 1 and 4, the degree centrality impartation unit 133 will be described. The degree centrality impartation unit 133 imparts the degree centrality calculated by the degree centrality calculation unit 132, as a feature, to the statistical value data DO on the 5-tuple flows in the certain time period (see (B) in FIG. 4). The degree centrality impartation unit 133 outputs, to the detection unit 134, impartation data D1 to which the degree centrality related to 5-tuple values is imparted.

Figure 10:
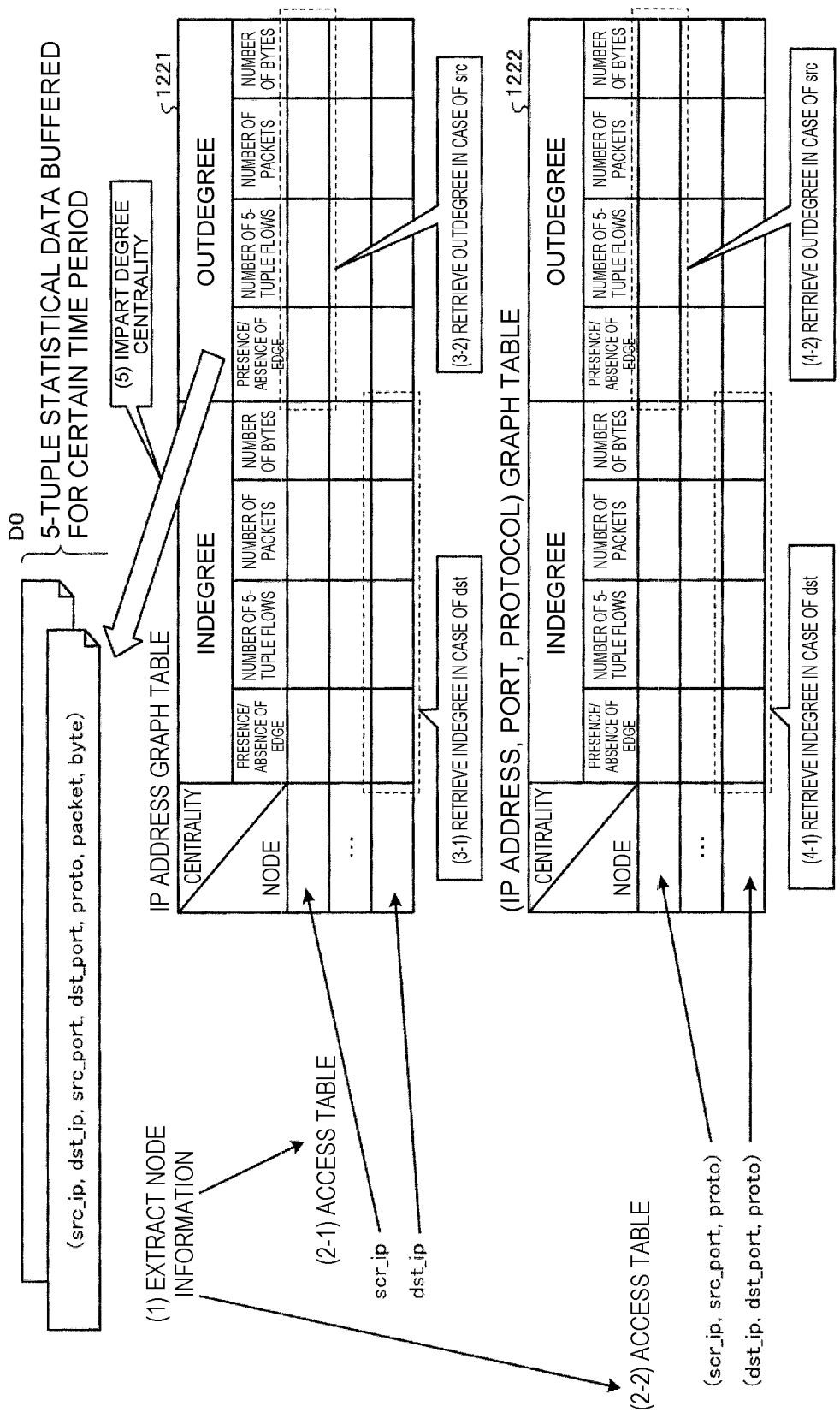
FIG. 10 is a diagram describing processing by the centrality impartation unit.

Processing by the degree centrality impartation unit 133 will be described specifically with reference to FIG. 10. FIG. 10 is a diagram describing the processing by the degree centrality impartation unit 133. As shown in FIG. 7, the degree centrality impartation unit 133 extracts information on a node under impartation of a feature, from the statistical value data DO on the 5-tuple flows in the certain time period (see (1) in FIG. 10). The degree centrality impartation unit 133 then selects either the graph table 1221 or the graph table 1222, depending on the granularity of the node under impartation.

When the granularity is an IP address, the degree centrality impartation unit 133 selects the graph table 1221, and accesses, in the graph table 1221, a row in which the extracted node is stated (see (2-1) in FIG. 10). When the granularity is a combination of an IP address, a port number, and protocol information, the degree centrality impartation unit 133 selects the graph table 1222, and accesses, in the graph table 1222, a row in which the extracted node is stated (see (2-2) in FIG. 10).

Subsequently, when the extracted node is a destination IP address (dst_ip), the degree centrality impartation unit 133 retrieves each field under the indegree in the accessed row (see (3-1), (4-1) in FIG. 10). When the extracted node is a source IP address (src_ip), the degree centrality impartation unit 133 retrieves each field under the outdegree in the accessed row (see (3-2), (4-2) in FIG. 10).

The degree centrality impartation unit 133 then imparts the retrieved degree centrality, as a feature, to the statistical value data DO on the 5-tuple flows (see (5) in FIG. 7).

Next, referring back to FIG. 1, the detection unit 134 will be described. The detection unit 134 detects, based on the impartation data D1, which is the statistical value data DO on the 5-tuple flows in the certain time period to which the degree centrality related to 5-tuple values is imparted, whether or not the flows in the certain time period have abnormality. For example, by using machine learning or the like, the detection device 10 pre-learns statistical value data on flows in a certain time period and a characteristic of a degree centrality imparted to the statistical value data on the 5-tuple flows in the certain time period at a normal time. The detection unit 134 compares, with a result of the learning, the statistical value data on the 5-tuple flows in the certain time period under analysis and the degree centrality imparted to the statistical value data on the flows in the certain time period, and thereby detects whether or not the 5-tuple flows under analysis have abnormality.

For example, baselines for statistical value data on 5-tuple flows in a certain time period and a corresponding degree centrality at a normal time are set in the detection device 10, by learning, in machine learning or the like, statistical value data on 5-tuple flows in a certain time period and a characteristic of a degree centrality imparted to the statistical value data on the 5-tuple flows in the certain time period at a normal time. When the statistical value data on the 5-tuple flows under analysis and the imparted degree centrality deviate from the baselines by predetermined values or more, the detection unit 134 determines abnormality and detects an attack.

[Procedure of Detection Processing by Detection Device]

Figure 11:
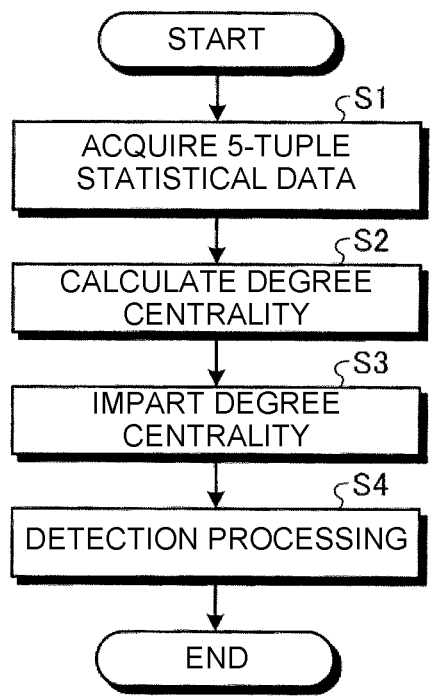
FIG. 11 is a flowchart showing a processing procedure of detection processing according to the embodiment.

Next, a processing procedure of detection processing by the detection device 10 will be described. FIG. 11 is a flowchart showing the processing procedure of the detection processing according to the embodiment.

As shown in FIG. 11, in the detection device 10, the statistic unit 131 acquires statistical value data on 5-tuple statistical flows, with respect to received packets buffered for a certain time period (step S1). The degree centrality calculation unit 132 calculates a degree centrality of a node, based on the statistical value data on the 5-tuple flows in the certain time period acquired by the statistic unit 131 (step S2).

The degree centrality impartation unit 133 imparts the degree centrality calculated by the degree centrality calculation unit 132, as a feature, to the statistical value data on the 5-tuple flows in the certain time period (step S3). Based on the impartation data with the imparted degree centrality related to 5-tuple values, the detection unit 134 detects whether or not the flows in the certain time period have abnormality (step S4), and transmits a result of the detection to a countermeasure device.

Effects of Embodiment

As described above, the detection device 10 according to the embodiment calculates a degree centrality of a node including an indegree, which is a total sum of weights of edges flowing into the node, and an outdegree, which is a total sum of weights of edges flowing out of the node, based on statistical value data on 5-tupl flows in a certain time period, and imparts the degree centrality, as a feature, to the statistical value data on the 5-tuple flows.

Specifically, with respect to a certain node, the detection device 10 calculates, as a degree centrality, an outdegree that represents the number of communication-destination nodes with which the node communicates, the number of packets sent out by the node, the number of bytes sent by the node, and the number of flows sent out by the node, and an indegree that represents the number of source nodes with which the certain node, the node communicates, the number of packets received by the node, the number of bytes received by the node, and the number of flows received by the node. In other words, the detection device 10 calculates a degree centrality related to a network structure, as a feature.

Accordingly, by imparting the degree centrality related to the network structure, as a feature, to the statistical value data on the 5-tuple flows, the detection device 10 can achieve attack detection based on a network-structure perspective, whereby accuracy in DDos attack detection can be enhanced.

Node granularity is an IP address or a combination of an IP address, a port number, and protocol information, and the detection device 10 stores in advance the graph table 1221, in which an IP address of a node is associated with an indegree and an outdegree of the node, and the graph table 1222, in which a combination of an IP address, a port number, and protocol information of a node is associated with an indegree and an outdegree of the node. Accordingly, the detection device 10 can calculate a degree centrality appropriately by selecting the graph table 1221 or the graph table 1222, depending on the granularity of a node under analysis, and calculating the degree centrality by using the selected table.

Example 1

Figure 12:
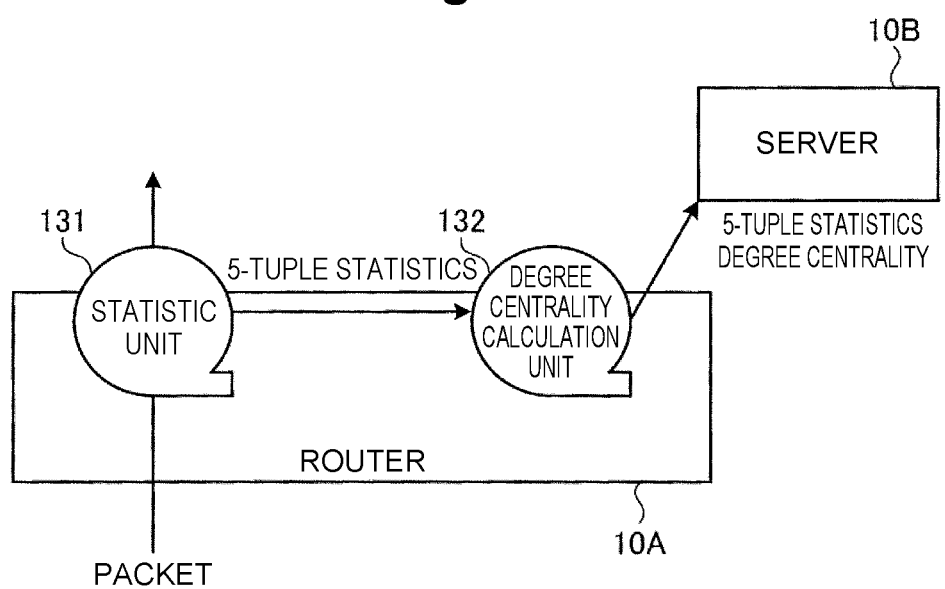
FIG. 12 is a diagram describing an example 1 of the embodiment.

The functions of the detection device 10 according to the present embodiment may be deployed in a distributed manner among a plurality of devices in a communication system. FIG. 12 is a diagram describing an example 1 of the embodiment.

As shown in FIG. 12, the statistic unit 131, the degree centrality calculation unit 132, and the degree centrality impartation unit 133 (not shown) may be provided to a router 10A, the router 10A may perform acquisition of statistical data on 5-tuple statistical flows and calculation of a degree centrality, and a server 10B may perform abnormality detection based on the impartation data D1.

Example 2

Figure 13:
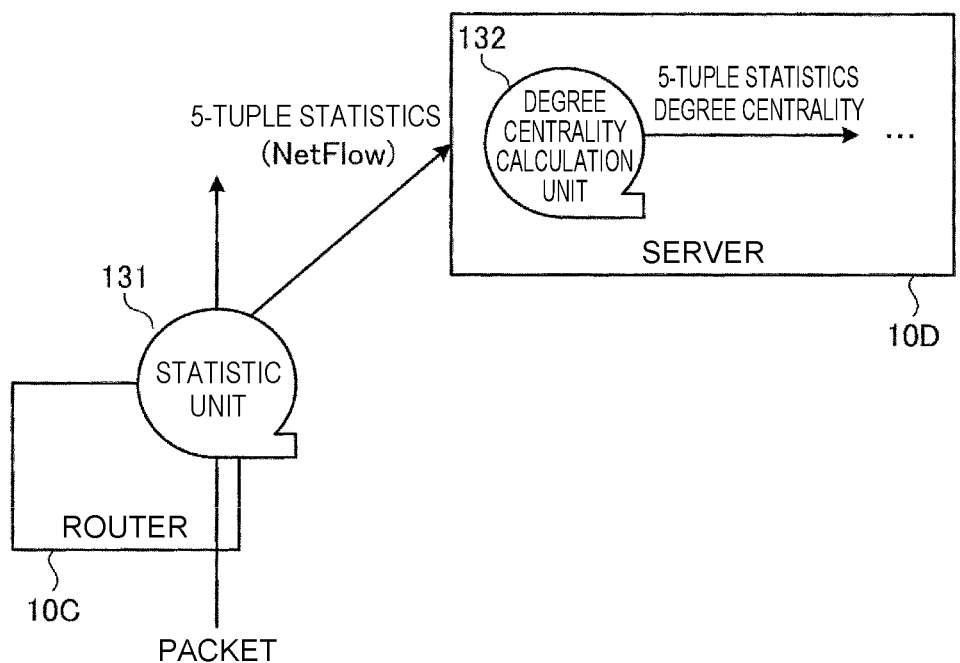
FIG. 13 is a diagram describing an example 2 of the embodiment.

FIG. 13 is a diagram describing an example 2 of the embodiment. As shown in FIG. 13, the statistic unit 131 may be provided to a router 10C, and the degree centrality calculation unit 132, the degree centrality impartation unit 133 (not shown), and the detection unit 134 (not shown) may be provided to a server 10D. In such a case, the router 10C performs acquisition of statistical data on 5-tuple statistical flows, and the server 10D performs calculation of a degree centrality and abnormality detection.

Example 3

Figure 14:
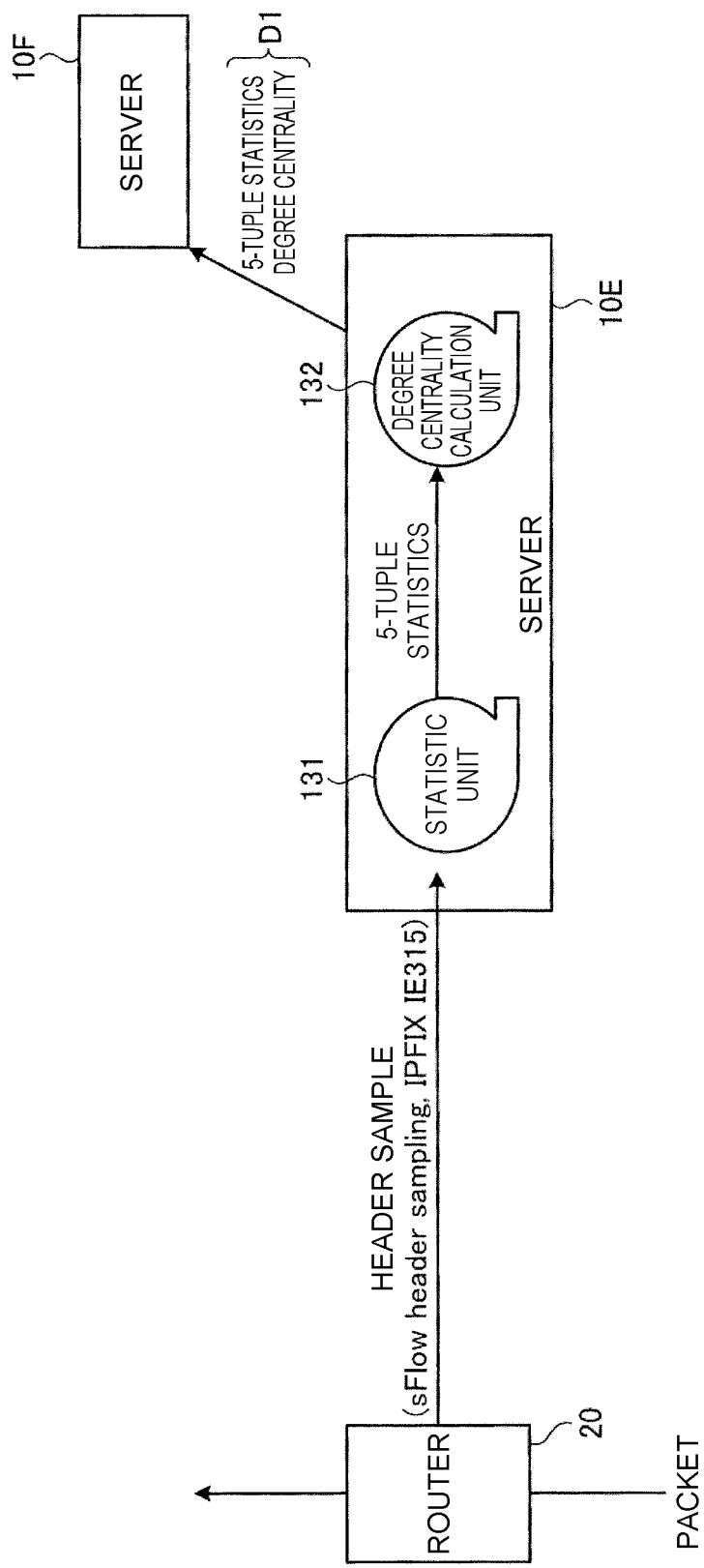
FIG. 14 is a diagram describing an example 3 of the embodiment.
Figure 15:
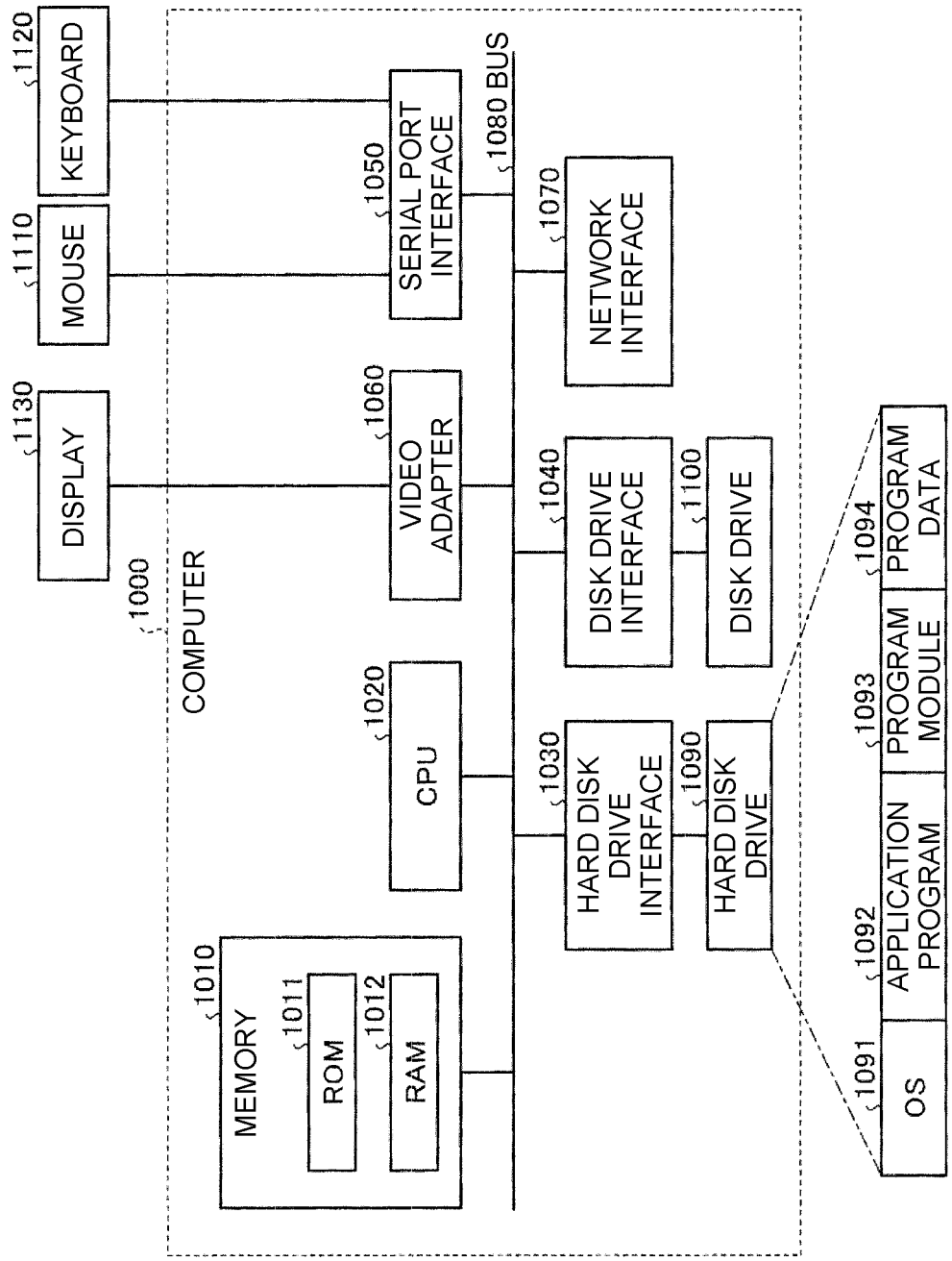
FIG. 15 shows an example of a computer by which a program is executed and the detection device is thereby implemented.

FIG. 14 is a diagram describing an example 3 of the embodiment. As shown in FIG. 14, a router 20 may send a header sample to a server 10E, and the server 10E may perform acquisition of statistical data on 5-tuple statistical flows and calculation of a degree centrality. A different server 10F from the server 10E performs abnormality detection based on the impartation data D1.

[System Configuration and the Like]

Each component of each device depicted in the drawings is of a functional concept, and does not necessarily need to be physically configured as depicted in the drawings. In other words, a specific distributed or integrated form of each device is not limited to those depicted in the drawings, and an entirety or part of each device can be functionally or physically configured in a distributed or integrated manner in arbitrary units, depending on various loads, usage situations, and the like. Moreover, all, or any one or some, of the functions for the processing performed in each device can be implemented by a CPU and a program that is analyzed and executed by the CPU, or can be implemented by wired logic-based hardware.

Of the processing steps described in the present embodiment, all, or one or some, of processing steps described as being automatically performed may be manually performed, or all, or one or some, of processing steps described as being manually performed may be automatically performed by using a well-known method. In addition, the information described in the above description and the drawings, including processing procedures, control procedures, specific names, and various data and parameters, can be arbitrarily changed unless otherwise specified.

[Program]

FIG. 16 shows an example of a computer by which a program is executed and the detection device 10 is thereby implemented. The computer 1000 includes, for example, a memory 1010 and a CPU 1020. Moreover, the computer 1000 includes a hard disk drive interface 1030, a disk drive interface 1040, a serial port interface 1050, a video adapter 1060, and a network interface 1070. Such components are connected to each other by a bus 1080.

The memory 1010 includes a ROM (Read Only Memory) 1011 and a RAM 1012. For example, the ROM 1011 stores a boot program such as BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS (Operating System) 1091, an application program 1092, a program module 1093, and program data 1094. In other words, the program defining each processing step in the detection device 10 is implemented as the program module 1093 in which computer-executable codes are described. The program module 1093 is stored, for example, in the hard disk drive 1090. For example, the program module 1093 for execution of processing similar to the functional components of the detection device 10 is stored in the hard disk drive 1090. Note that the hard disk drive 1090 may be substituted by an SSD (Solid State Drive).

Setting data used in the processing in the embodiment described above is stored as the program data 1094, for example, in the memory 1010 or the hard disk drive 1090. The CPU 1020 reads and executes on the RAM 1012, the program module 1093 or the program data 1094 stored in the memory 1010 or the hard disk drive 1090 when necessary.

Note that the program module 1093 and the program data 1094 are not limited to being stored in the hard disk drive 1090, but may be stored, for example, in a removable storage medium and may be read by the CPU 1020 via the disk drive 1100 or the like. Alternatively, the program module 1093 and the program data 1094 may be stored in another computer connected through a network (LAN, WAN (Wide Area Network), or the like). Then, the program module 1093 and the program data 1094 may be read from the other computer by the CPU 1020 via the network interface 1070.

Although embodiments to which the invention made by the present inventor is applied have been described hereinabove, the present invention is not limited by the description and the drawings based on the present embodiment that are part of the disclosure of the present invention. In other words, all of other embodiments, examples, operational techniques, and the like worked based on the present embodiment by persons skilled in the art and the like are incorporated in the scope of the present invention.

REFERENCE SIGNS LIST

10 Detection device
11 Communication unit
12 Storage unit
13 Control unit
131 Statistic unit
132 Degree centrality calculation unit
133 Degree centrality impartation unit
134 Detection unit

The invention claimed is:

1. An impartation device comprising one or more processors configured to:
acquire statistical value data on 5-tuple flows in a certain time period;
calculate a degree centrality of a node including an indegree, which is a total sum of a weight of each edge flowing into the node, and an outdegree, which is a total sum of a weight of each edge flowing out of the node, based on the statistical value data on the 5-tuple flows in the certain time period;
impart the degree centrality, as a feature related to the statistical value data on the 5-tuple flows in the certain time period;
compare i) the degree centrality of the node in the certain time period with ii) a baseline degree centrality in the certain time period at a normal time, that includes a baseline indegree and a baseline outdegree; and
based on the comparing, detect abnormality at the node comprising:
  in response to determining that the indegree is high comparing to a baseline indegree of the baseline degree centrality, determine that the node is a victim, and
  in response to determining that the outdegree is high comparing to a baseline outdegree of the baseline degree centrality, determine that the node is an attacker or an infected node.

2. The impartation device according to claim 1, wherein granularity of the node is an IP address, or a combination of an IP address, a port number, and protocol information.

3. The impartation device according to claim 2, wherein the one or more processors are configured to select a first table, in which the IP address of the node is associated with the indegree and the outdegree of the node, or a second table, in which the combination of the IP address, the port number, and the protocol information of the node is associated with the indegree and the outdegree of the node, depending on the granularity of the node under analysis, and calculate the degree centrality for the statistical value data on the 5-tuple flows in the certain time period by using the selected table.

4. The impartation device according to claim 1, wherein the one or more processors are further configured to detect whether or not the 5-tuple flows in the certain time period under analysis have abnormality, by comparing the statistical value data on the 5-tuple flows in the certain time period under analysis and the degree centrality in the certain time period, with a result of learning obtained by pre-learning the statistical value data on the 5-tuple flows in the certain time period and a characteristic of the degree centrality in the certain time period at the normal time.

5. An impartation method executed by an impartation device, comprising:
- acquiring statistical value data on 5-tuple flows in a certain time period;
- calculating a degree centrality of a node including an indegree, which is a total sum of a weight of each edge flowing into the node, and an outdegree, which is a total sum of a weight of each edge flowing out of the node, based on the statistical value data on the 5-tuple flows in the certain time period;
- imparting the degree centrality, as a feature related to the statistical value data on the flows in the certain time period;
- comparing i) the degree centrality of the node in the certain time period with ii) a baseline degree centrality in the certain time period at a normal time, that includes a baseline indegree and a baseline outdegree; and
- based on the comparing, detecting abnormality at the node comprising:
  - in response to determining that the indegree is high comparing to a baseline indegree of the baseline degree centrality, determine that the node is a victim, and
  - in response to determining that the outdegree is high comparing to a baseline outdegree of the baseline degree centrality, determine that the node is an attacker or an infected node.

6. A non-transitory computer readable medium storing one or more instructions causing a computer to execute:
- acquiring statistical value data on 5-tuple flows in a certain time period;
- calculating a degree centrality of a node including an indegree, which is a total sum of a weight of each edge flowing into the node, and an outdegree, which is a total sum of a weight of each edge flowing out of the node, based on the statistical value data on the 5-tuple flows in the certain time period;
- imparting the degree centrality, as a feature related to the statistical value data on the 5-tuple flows in the certain time period;
- comparing i) the degree centrality of the node in the certain time period with ii) a baseline degree centrality in the certain time period at a normal time, that includes a baseline indegree and a baseline outdegree; and
- based on the comparing, detecting abnormality at the node comprising:
  - in response to determining that the indegree is high comparing to a baseline indegree of the baseline degree centrality, determine that the node is a victim, and
  - in response to determining that the outdegree is high comparing to a baseline outdegree of the baseline degree centrality, determine that the node is an attacker or an infected node.

7. The impartation method according to claim 5, wherein granularity of the node is an IP address, or a combination of an IP address, a port number, and protocol information.

8. The impartation method according to claim 7, comprising:
- selecting a first table, in which the IP address of the node is associated with the indegree and the outdegree of the node, or a second table, in which the combination of the IP address, the port number, and the protocol information of the node is associated with the indegree and the outdegree of the node, depending on the granularity of the node under analysis; and
- calculating the degree centrality for the statistical value data on the 5-tuple flows in the certain time period by using the selected table.

9. The impartation method according to claim 5, comprising:
- detecting whether or not the 5-tuple flows in the certain time period under analysis have abnormality, by comparing the statistical value data on the 5-tuple flows in the certain time period under analysis and the degree centrality in the certain time period, with a result of learning obtained by pre-learning the statistical value data on the 5-tuple flows in the certain time period and a characteristic of the degree centrality in the certain time period at the normal time.

10. The non-transitory computer readable medium according to claim 6, wherein granularity of the node is an IP address, or a combination of an IP address, a port number, and protocol information.

11. The non-transitory computer readable medium according to claim 10, wherein one or more instructions cause the computer to execute:
- selecting a first table, in which the IP address of the node is associated with the indegree and the outdegree of the node, or a second table, in which the combination of the IP address, the port number, and the protocol information of the node is associated with the indegree and the outdegree of the node, depending on the granularity of the node under analysis; and
- calculating the degree centrality for the statistical value data on the 5-tuple flows in the certain time period by using the selected table.

12. The non-transitory computer readable medium according to claim 6, wherein the one or more instructions cause the computer to execute:
- detecting whether or not the 5-tuple flows in the certain time period under analysis have abnormality, by comparing the statistical value data on the 5-tuple flows in the certain time period under analysis and the degree centrality in the certain time period, with a result of learning obtained by pre-learning the statistical value data on the 5-tuple flows in the certain time period and a characteristic of the degree centrality in the certain time period at the normal time.

\* \* \* \* \*